US012409100B1

(12) United States Patent
Liu et al.

(10) Patent No.: US 12,409,100 B1
(45) Date of Patent: Sep. 9, 2025

(54) SYSTEMS AND METHODS FOR OPERATING A STIMULATION DEVICE TO PROVIDE SEXUAL STIMULATION AND RELEASE A VOLATILE MEDIUM

(71) Applicant: HYTTO PTE. LTD, Singapore (SG)

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/672,069

(22) Filed: May 23, 2024

(51) Int. Cl.
*A61H 19/00* (2006.01)

(52) U.S. Cl.
CPC ....... *A61H 19/50* (2013.01); *A61H 2201/102* (2013.01); *A61H 2201/5007* (2013.01); *A61H 2201/5025* (2013.01); *A61H 2201/5097* (2013.01)

(58) Field of Classification Search
CPC ........ A61H 19/00; A61H 19/30; A61H 19/32; A61H 19/50; A61H 2201/0153; A61H 2201/5023; A61H 2201/501; A61H 2201/5097; A61H 2201/5007; A61H 2230/085; G06F 3/011; G06T 7/251
See application file for complete search history.

(56) References Cited

U.S. PATENT DOCUMENTS 10,576,013 B1 3/2020 Sloan
11,197,074 B2 12/2021 Sloan

FOREIGN PATENT DOCUMENTS

WO WO-2014127523 A1 * 8/2014 ............. A61H 19/00

OTHER PUBLICATIONS

WO2014127523A1 English translation (Year: 2014).*

* cited by examiner

*Primary Examiner* — Christine H Matthews
(74) *Attorney, Agent, or Firm* — Holtz, Holtz & Volek PC

(57) ABSTRACT

The present invention relates to systems and methods for providing interactive adult entertainment. The system includes a communication interface, a memory, and a processor. The processor monitors a first set of actions in content hosted in an interactive application. The processor generates a triggering instruction in response to an occurrence of at least one action among the first set of actions in the content. Further, the processor determines gaseous characteristics and operating parameters. The processor transmits a first control instruction appended with the gaseous characteristics and the operating parameters to at least a first user and at least one second user. The first control instruction operates at least one of a first gas generating device of the first user and a second gas generating device of the at least one second user to release a volatile medium corresponding to the gaseous characteristics and the operating parameters.

18 Claims, 7 Drawing Sheets

SYSTEMS AND METHODS FOR OPERATING A STIMULATION DEVICE TO PROVIDE SEXUAL STIMULATION AND RELEASE A VOLATILE MEDIUM

TECHNICAL FIELD

The present invention relates generally to electronic-based adult entertainment systems and methods, and more particularly relates to systems and methods for operating a stimulation device to provide sexual stimulation and release a volatile medium (or generate odor) corresponding to actions performed in sexual content.

BACKGROUND

Sexual stimulation can be achieved by an individual or a group of individuals (irrespective of gender) by using various means. Conventionally, self-operated sex toys are used by an individual for experiencing sexual stimulation. However, the individual may not always feel the same level of sexual stimulation at every instance using conventional sex toys as they have limited operating functionality.

Currently, social media and the ability to extend wireless interfaces, local and wide area networking, etc., have contributed to new methods and systems for experiencing sexual stimulation. In one example scenario, the individual may be allowed to experience enhanced sexual stimulation while viewing the sexual content. Additionally, the sex toys are operated to mimic the actions performed in the sexual content. However, in most cases, the sex toys may not be synchronized with the sexual content, thus resulting in an unsatisfied sexual experience while operating the sex toys. In another example scenario, live broadcasts featuring sexual content within the adult entertainment industry are increasing. These live broadcasts have experienced substantial growth over the years. For instance, models engaging in sexual acts, with or without the use of adult toys, are streamed in such live broadcasts. The current method of controlling the sex toy during the live broadcast is primarily reliant on various factors, leading to relatively simple interactions. Consequently, users may fail to provide intense sexual pleasure to viewers as per their individual preferences.

Therefore, there is a need for systems and methods for providing interactive adult entertainment to users that overcome the aforementioned deficiencies along with providing other advantages.

SUMMARY

Various embodiments of the present disclosure disclose systems and methods for operating a sexual stimulation device to provide sexual stimulation and release a volatile medium (or generate odor) corresponding to actions performed in content such as sexual content.

In an embodiment, a system is disclosed. The system includes a memory storing executable instructions, and a processor operatively coupled with the memory. The processor is configured to execute the executable instructions to cause the system to at least monitor a first set of actions in content being hosted in an interactive application through which at least one second user communicates with a first user. The processor is configured to generate a triggering instruction in response to an occurrence of at least one action among the first set of actions in the content being hosted in the interactive application by the first user. Further, the processor is configured to determine one or more gaseous characteristics and one or more operating parameters corresponding to the one or more gaseous characteristics. The processor is further configured to transmit a first control instruction appended with the one or more gaseous characteristics and the one or more operating parameters to at least one of a first gas generating device and a second gas generating device. The first control instruction operates at least one of the first gas generating device associated with the first user and the second gas generating device associated with the at least one second user to release a volatile medium corresponding to the one or more gaseous characteristics and the one or more operating parameters.

In another embodiment, a computer-implemented method is disclosed. The computer-implemented method performed by a system includes monitoring a first set of actions in content being hosted in an interactive application through which at least one second user communicates with a first user. The method includes generating a triggering instruction in response to an occurrence of at least one action among the first set of actions in the content being hosted in the interactive application. Further, the method includes in response to the triggering instruction, determining one or more gaseous characteristics and one or more operating parameters corresponding to the one or more gaseous characteristics. The method further includes transmitting a first control instruction appended with the one or more gaseous characteristics and the one or more operating parameters to at least one of a first gas generating device and a second gas generating device. The first control instruction operates at least one of the first gas generating device associated with the first user and the second gas generating device associated with the at least one second user to release a volatile medium corresponding to the one or more gaseous characteristics and the one or more operating parameters.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or conjunction with each other, one skilled in the art will appreciate that many of these features can be provided independently of other features.

Various embodiments of the present invention are described hereinafter with reference to FIG. 1 to FIG. 7.

Figure 1:
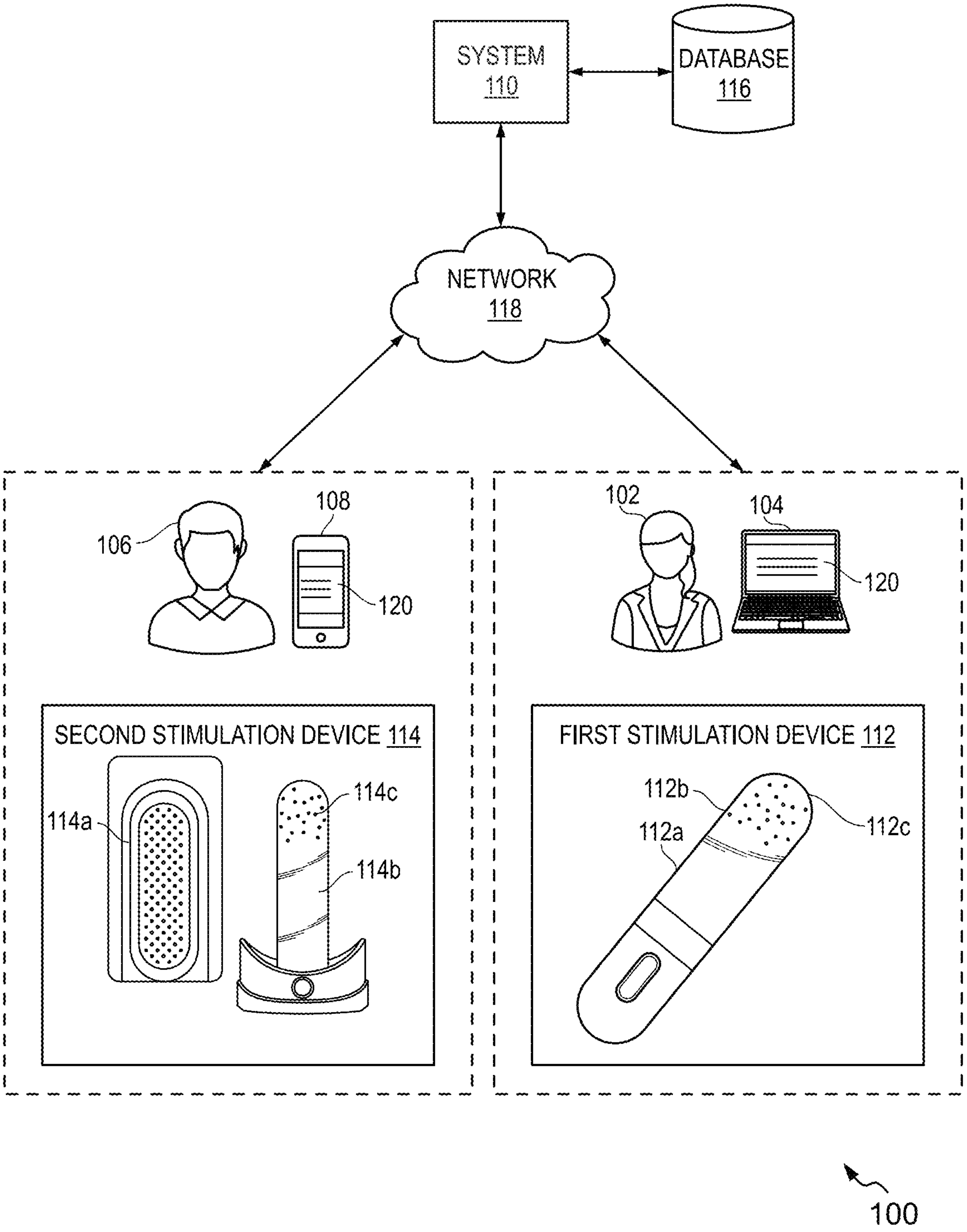
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a user device 104 associated with a first user 102 and a user terminal 108 associated with at least one second user 106. The user device 104 and the user terminal 108 may include at least a laptop computer, a phablet computer, a handheld personal computer, a virtual reality (VR) device, a netbook, a Web book, a tablet computing device, a smartphone, or other mobile computing devices. Further, the first user 102 and the second user 106 are associated with a first stimulation device 112 and a second stimulation device 114, respectively. The first stimulation device 112 and the second stimulation device 114 may be connected wired/wirelessly with the user device 104 and the user terminal 108. Some examples of the wireless connectivity for enabling a connection between the first stimulation device 112 and the user device 104, and the second stimulation device 114 and the user terminal 108 may be, but not limited to, near field communication (NFC), wireless fidelity (Wi-Fi), Bluetooth and the like.

In one scenario, the first stimulation device 112 and the second stimulation device 114 are configured to provide sexual stimulation to the first user 102 and the second user 106, respectively, when the first stimulation device 112 and the second stimulation device 114 are in contact with user's body. In another scenario, the first stimulation device 112 and the second stimulation device 114 are gas generating devices that are configured to release a volatile medium (i.e., scent/odor generating function) to the first user 102 and the second user 106, respectively. In another scenario, the first stimulation device 112 and the second stimulation device 114 integrate a sexual stimulation device and an gas generating device to provide the sexual stimulation and the release of volatile medium to the first user 102 and the second user 106, respectively.

In particular, the first stimulation device 112 includes a first adult toy 112*a* and a first gas generating device 112*b*. The second stimulation device 114 includes a second adult toy 114*a* and a second gas generating device 114*b*. It is to be noted that the first and second adult toys 112*a* and 114*a* are selected based on the gender of the first and second users 102 and 106. For instance, the second adult toy 114*a* is a male sex toy, and the first adult toy 112*a* is a female sex toy. Some examples of female sex toys may include, but are not limited to, a dildo, a vibrator, and the like. Examples of male sex toys may include masturbators. Further, the first gas generating device 112*b* and the second gas generating device 114*b* are configured to release the volatile medium that results in the production of a specific odor corresponding to a determined gaseous characteristics which will be explained further in greater detail.

The first stimulation device 112 is a female sex toy as explained above. The first stimulation device 112 including the first adult toy 112*a* and the first gas generating device 112*b* is configured with an insertion end 112*c*. The insertion end 112*c* is adapted to be inserted into the user's body to provide stimulation (physical stimulation) and configured to release different odors.

As explained above, the second adult toy 114*a* is a male sex toy. For example, the second adult toy 114*a* may be configured with a vagina-shaped cavity (not shown in Figures) for the insertion of the penis of the second user 106. The vagina-shaped cavity may be configured in conformity to the diametrical size of the penis for allowing insertion of the penis therein. Further, the vagina-shaped cavity may be configured with elastic materials for accommodating various diametrical sizes of the penis therein. Further, the second gas generating device 114*b* may include a plurality of orifices 114*c* for releasing the volatile medium (or odor release). It is to be noted that each orifice of the plurality of orifices 114*c* may be configured to release different odors (interchangeably referred to as 'gas' and 'volatile medium' throughout the present disclosure). Further, the vagina-shaped cavity of the second adult toy 114*a* may be placed in proximity to the orifices 114*c* of the second gas generating device 114*b* to collect the odor released through the orifices 114*c*. In an embodiment, the second gas generating device 114*b* may be inserted into the second adult toy 114*a*. In one embodiment, the gas generating device (i.e., the first gas generating device 112*b* and the second gas generating device 114*b*) includes a guide through which the volatile medium is released to the user's nose.

Various entities in the environment 100 may connect to a network 118 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 118 may include a secure protocol (e.g., Hypertext Transfer Protocol (HTTP)), and/or any other protocol, or set of protocols. In an example embodiment, the network 118 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

The environment 100 further includes a system 110. The system 110 is configured to host and manage an interactive application 120. In an embodiment, the system 110 may be a server configured to host and manage the interactive application 120. The system 110 may be embodied in at least one computing device in communication with the network 118. The system 110 may be specifically configured, via executable instructions to perform one or more of the operations described herein. In general, the system 110 is configured to provide interactive adult entertainment through the interactive application 120. Further, the interactive application 120 is a set of computer-executable codes configured to allow the first user 102 to create content in a live broadcast (i.e., pornographic live broadcast) for the at least one second user (e.g., the second user 106) and/or allow the first user 102 and the second user 106 to remotely connect through the interactive application 120 in a teledildonic scene. In one embodiment, the interactive application 120 may be accessed as a web-based application on the user device 104 and the user terminal 108. In another embodiment, the user device 104 and the user terminal 108 may access an instance of the interactive application 120 from the system 110 for installation on the user devices 104 and the user terminal 108 using application stores associated with operating systems such as Apple iOS®, Android™ OS, Google Chrome OS, Symbian OS®, Windows Mobile® OS, and the like. In another embodiment, the system 110 may be a server or an application configured to control the gas generating device (i.e., the first gas generating device 112*b* and the second gas generating device 114*b*) to release different volatile medium in different scene.

In an embodiment, the system 110 monitors a first set of actions in the content being hosted in the interactive application 120 through which the at least one second user 106 communicates with the first user 102. The interactive application 120 may be equipped in the user device 106. The content may be hosted by the first user 102 in the interactive application 120. This provides access to the second user 106 to view the content of the first user 102 using the interactive application 120.

In one scenario, the first user 102 may be a model user or a creator of the content. The content being hosted by the first user 102 in the interactive application 120 is a live broadcast (or a pornographic live broadcast). In this scenario, users (e.g., the second user 106) of the interactive application 120 access the content of the first user 102 in the interactive application. 120. For illustration purposes, only one first user and one second user are depicted in FIG. 1, however, there can be any number of first users and second users, therefore it should not be considered to limit the scope of the present disclosure. In one scenario, the first user 102 creates the content using the user device 104. In another scenario, the first user 102 may include an image capturing module (not shown in Figures) connected to the user device 104 using wired/wireless communication. Some examples of wireless communication may include Bluetooth, near-field communication (NFC), wireless fidelity (Wi-Fi), and the like. The first user 102 may utilize the image capturing module connected to the user device 104 for capturing the content. Further, the scenario of the first user 102 hosting the content (e.g., sexual content) for the second user 106 in the interactive application 120 to experience sexual stimulation is referred to as a pornographic live broadcast scenario.

In another scenario, the first user 102 may remotely connect with the second user 106 (i.e., one-to-one interaction) in the interactive application 120 to experience sexual stimulation. This scenario of one-to-one interaction between the first user 102 and the second user 106 in the interactive application 120 to experience sexual stimulation is referred to as a teledildonic scenario.

In both the scenarios, the system 110 may receive a request from the user terminal 108 associated with the second user 106 to access the content being hosted by the first user 102 in the interactive application 120. The system 110 facilitates a wireless communication between the user terminal 108 of the second user 106 and the user device 104 of the first user 102 through the interactive application 120. This enables the second user 106 to access the content of the first user 102 via the interactive application 120. In an embodiment, the first user 102 may set viewing restrictions in the interactive application 120. In this scenario, the system 110 may provide enable the second user 106 access to the content of the first user 102 in the interactive application 120 when the first user 102 accepts the request received from the second user 106.

As explained above, the system 110 is configured to monitor the first set of actions in the content being hosted by the first user 102 in the interactive application 120. The first set of actions may be user activity of the first user 102 in the content, live broadcast stats (e.g., number of viewers, comments, etc.), activities of the first stimulation device 112 and the second stimulation device 114, and the like. Based on the first set of actions, the system 110 receives a triggering instruction from the interactive application 120 equipped in the user device 104. In particular, the interactive application 120 generates the trigger instruction to the system 110 in response to an occurrence of at least one action among the first set of actions in the content being hosted by the first user 102. The trigger instruction is transmitted from the user device 104 to the system 110 via the network 118. Thereafter, the system 110 determines one or more gaseous characteristics and one or more operating parameters corresponding to the one or more gaseous characteristics upon receipt of the triggering instruction. The gaseous characteristics may include odors such as jasmine odor, coffee odor, shit odor, vaginal odor, semen odor, and the like. Further, the system 110 transmits a first control instruction appended with the gaseous characteristics and the operating parameters to at least the first user 102 and the second user 106. The first control instruction operates the first gas generating device 112*b* and the second gas generating device 114*b* to release the volatile medium corresponding to the gaseous characteristics and the operating parameters. The operating parameters may be an operating time and an operating intensity.

In addition, the system 110 is configured to render at least one image data corresponding to the gaseous characteristics in the content of the first user 102. This enables the second user 106 with access to the content of the first user 102 to view the image data corresponding to each of the one or more gaseous characteristics. It is to be noted that the image data corresponding to the specific odor (or the gaseous characteristics) superimposed on the content of the first user 102 will be displayed to all of the viewers (or the second user 106) of the content. Further, the viewers (or the second user 106) with the second gas generating device 114*b* are operated to release the volatile medium similar to the operations of the first gas generating device 112*b* of the first user 102. Further, the system 110 renders the at least one image data in the content of the first user 102 based on determining at least one display rule. The information related to the gaseous characteristics, the image data, display rules may be stored in a database 116 associated with the system 110.

Further, the system 110 generates a second control instruction for operating the first adult toy 112*a* and the second adult toy 114*a*. In particular, the system 110 generates the second control instruction in response to determining the one or more gaseous characteristics and the one or more operating parameters corresponding to the trigger instruction. The second control instruction operates the first adult toy 112*a* and the second adult toy 114*a* to perform predetermined actions corresponding to the one or more gaseous characteristics, thereby providing sexual stimulation to the first user 102 and the second user 106, respectively.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of the environment 100 may perform one or more functions described as being performed by another set of systems or another set of devices of the environment 100.

Figure 2:
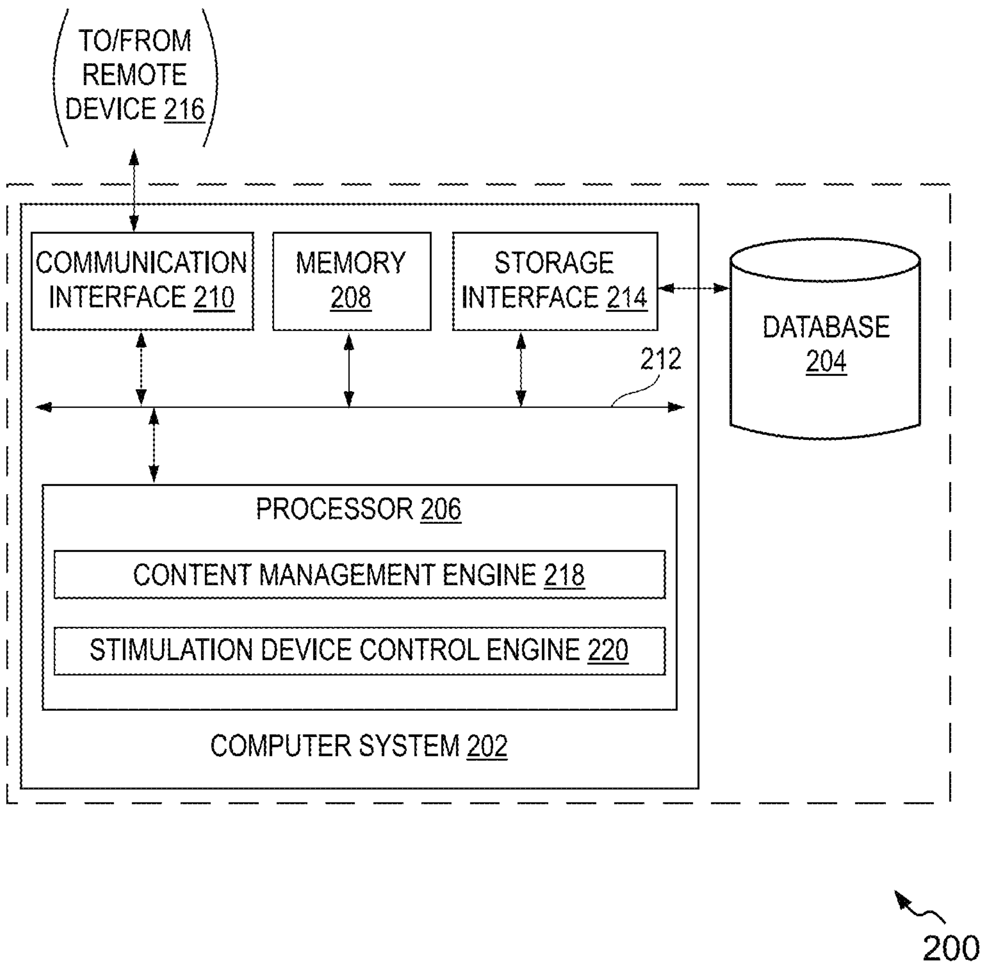
FIG. 2 illustrates a simplified block diagram of a system used for providing interactive adult entertainment, in accordance with an embodiment of the present disclosure.

FIG. 2 illustrates a simplified block diagram of a system 200 used for providing interactive adult entertainment, in accordance with an embodiment of the present disclosure. The system 200 may be an example of the system 110 of FIG. 1. The system 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the interactive application 120 and one or more components of the interactive application 120. The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the system 200, as described herein. In some embodiments, the memory 208 may be realized in the form of a database server or cloud storage working in conjunction with the system 200, without deviating from the scope of the present disclosure.

The processor 206 is operatively coupled to the communication interface 210 such that the processor 206 is capable of communicating with a remote device 216 such as the user device 104, the user terminal 108, the first stimulation device 112, the second stimulation device 114, or with any entity connected to the network 118 as shown in FIG. 1.

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

In one embodiment, the processor 206 includes a content management engine 218 and a stimulation device control engine 220. As such, the one or more components of the processor 206 as described above are communicably coupled with the interactive application 120.

The content management engine 218 includes suitable logic and/or interfaces for at least monitoring the content of the first user 102, content of the second user 106, modifying the content of the first user 102, and the like. In particular, the content management engine 218 monitors the first set of actions in the content created by the first user 102 in the interactive application 120. As explained above, the first user 102 and the second user 106 are connected with each other via the interactive application 120. The first set of actions is related to at least users (e.g., the first user 102 or the second user 106) of the interactive application 120 and data related to the content. Some non-limiting examples of the first set of actions may include a number of tokens provided to the content, a total number of tokens of the content, comments to the content from the second user 106, a total number of viewers of the content, a virtual effect provided by the second user 106 to the first user 102 in the content, and the like. In response to identifying at least one action from the first set of actions, the content management engine 218 receives the trigger instruction from the interactive application 120 equipped in the user device 104 of the first user 102.

The stimulation device control engine 220 includes suitable logic and/or interfaces for controlling the first stimulation device 112 and the second stimulation device 114 in response to the trigger instruction. In particular, the stimulation device control engine 220 determines the one or more gaseous characteristics and the one or more operating parameters corresponding to the one or more gaseous characteristics, in response to the triggering instruction. The stimulation device control engine 220 determines the gaseous characteristics from the database 204 corresponding to the trigger instruction being generated based on the at least one action of the first set of actions. In other words, in response to the triggering instruction, the one or more gaseous characteristics are matched by the stimulation device control engine 220.

Upon determining the gaseous characteristics, the stimulation device control engine 220 determines first operating parameters of the one or more operating parameters. The first operating parameters correspond to a total operating time and an operating intensity of the first stimulation device 112 for releasing the volatile medium corresponding to the one or more gaseous characteristics. The gaseous characteristics refer to odor, color, volume, and other aspects of gases (or the volatile medium). Further, releasing the volatile medium corresponds to releasing gases of different odors, colors, and volumes. For example, the one or more odors may include jasmine odor, coffee odor, shit odor, vaginal odor, and semen odor.

In one example scenario, a viewer (e.g., the second user 106) of the content of the first user 102 may provide 5 tokens to the first user 102 in the interactive application 120. In this scenario, the stimulation device control engine 220 fetches an gaseous characteristics of the one or more gaseous characteristics from the database 204 corresponding to 5 tokens provided by the second user 106 to the content. For example, the gaseous characteristics determined for 5 tokens is jasmine odor. In one example scenario, a viewer (e.g., the second user 106) of the content of the first user 102 may provide 20 tokens to the first user 102 in the interactive application 120. In this scenario, an gaseous characteristics among the one or more gaseous characteristics determined for 20 tokens may be semen odor.

In one embodiment, the stimulation device control engine 220 may randomly determine the gaseous characteristics corresponding to the trigger instruction based on preset rules. For example, if the viewer (or the second user 106) tips the first user 102 with 5 tokens, the stimulation device control engine 220 randomly matches one of several gaseous characteristics based on the preset rules. The preset rules may enable the stimulation device control engine 220 to render a task for determining the gaseous characteristics. For example, the task may be a game such as a prize wheel, and in response to the triggering instruction. In this example scenario, the stimulation device control engine 220 determines the gaseous characteristics based on the result of the game prize wheel. The preset rules may be defined for the first set of actions by the system 200 and stored in the database 204.

In an embodiment, the total operating time and the operating intensity of the first operating parameters may be constant for the determined gaseous characteristics. In other words, the total operating time and the operating intensity may be different for each of the gaseous characteristics. In another embodiment, the total operating time and the operating intensity may be in a discrete fashion (or different) for different gaseous characteristics, thus resulting in random odor generation. For example, if the second user 106 provides the first user 102 with 10 tokens. The stimulation device control engine 220 controls the odor-generating device (such as the first gas generating device 112*b* and the second gas generating device 114*b*) to randomly release different volatile media for different lengths of time randomly, thus resulting in random smell generation.

Thereafter, the stimulation device control engine 220 generates the first control instruction by appending with the determined gaseous characteristics and the first operating parameters. The stimulation device control engine 220 transmits the first control instruction appended with the gaseous characteristics and the corresponding first operating parameters to at least the first user 102 and the second user 106. The first control instruction operates the first gas generating device 112*b* of the first stimulation device 112 and the second gas generating device 114*b* of the second stimulation device 114 to release the volatile medium corresponding to the one or more gaseous characteristics and the first operating parameters.

In addition, the stimulation device control engine 220 generates the second control instruction corresponding to the one or more gaseous characteristics and second operating parameters. The second operating parameters are defined specifically for operating the adult toys (i.e., the first adult toy 112*a* and the second adult toy 114*a*) corresponding to the gaseous characteristics. The second operating parameters may include operating time and operating intensity for operating the first adult toy 112*a* and the second adult toy 114*a*. The stimulation device control engine 220 transmits the second control instruction to at least the user device 104 and the user terminal 108 in response to determining the gaseous characteristics and the second operating parameters corresponding to the trigger instruction. The second control instruction operates the first adult toy 112*a* of the first stimulation device 112 and the second adult toy 114*a* of the second stimulation device 114 to perform predetermined actions corresponding to the gaseous characteristics. The predetermined actions may be based on the type of sex toys i.e., the first adult toy 112*a* and the second adult toy 114*a*. The predetermined actions may be a vibrotactile output, reciprocating motion, and the like.

Further, the content management module 218 is configured to determine the at least one image data corresponding to each of the one or more gaseous characteristics. The gaseous characteristics are determined based on the first set of actions as explained above. In particular, the content management module 218 determines the image data corresponding to the determined gaseous characteristics. For example, if the gaseous characteristics determined is rose odor. The content management module 218 may fetch rose images to be rendered on the content of the first user 102. The content management module 218 may simultaneously superimpose the image data of the gaseous characteristics on the content of the first user 102 when the first gas generating device 112*b* and the second gas generating device 114*b* are operated to release the volatile medium corresponding to the determined gaseous characteristics. Further, superimposing the image data on the content of the first user 102 enables the second user 106 to view the gaseous characteristics being determined based on the first set of actions.

In addition, the content management module 218 determines a position of the first stimulation device 112 of the first user 102 in the content hosted in the interactive application 120. Thereafter, the content management module 218 determines at least one display rule for rendering the image data corresponding to the gaseous characteristics. The display rules are defined based at least on the position of the first stimulation device 112 in the content. Specifically, the display rules may be defined based on the position of the first gas generating device 112*b* of the first stimulation device 112 in the content. Alternatively, the display rules may be defined based on the position of the first adult toy 112*a* of the first stimulation device 112 in the content of the first user 102. The display rules may include, but not limited to, a rendering direction of the image data and concentration of a visual effect for the image data determined corresponding to the gaseous characteristics. Thereafter, the content management module 218 renders the image data and the visual effect corresponding to the gaseous characteristics based at least on the position of the first stimulation device 112 (or the first gas generating device 112*b*) and the at least one display rule. The image data and the visual effect rendered in the content of the first user 102 provides a visual representation of the volatile medium corresponding to the gaseous characteristics being released by the first gas generating device 112*b* of the first stimulation device 112 of the first user 102. The visual representation is provided on the content of the first user 102 in real-time.

Further, the content management module 218 receives a geographical location of the second user 106 via the interactive application 120. The content management module 218 determines the image data corresponding to the geographical location of the second user 106. The image data is determined associated with the geographical location information of the second user 106. For example, when the location information contains the sea, the determined image data is the image of the sea. The content management module 218 displays the image data corresponding to the geographical location of the second user 106 on the content being hosted by the first user 102 in the interactive application 120. The image data corresponding to the geographical location of the second user 106 is displayed on the content of the first user 102 by replacing a background in the content of the first user 102. In addition, the content management module 218 along with the stimulation device control engine 220 operates at least the first gas generating device 112*b* and the second gas generating device 114*b* based on the geographical location of the second user 106.

Furthermore, the content management module 218 determines a second set of actions performed by at least one of the first adult toy 112*a* of the first user 102 and the second adult toy 114*a* of the second user 106. The stimulation device control engine 220 determines the gaseous characteristics and third operating parameters of the one or more operating parameters corresponding to the second set of actions, for controlling the first gas generating device 112*b* and the second gas generating device 114*b*. The third operating parameters are determined based at least on motion information of at least one of the first adult toy 112*a* and the second adult toy 114*a*. The motion information of at least one of the first adult toy 112*a* and the second adult toy 114*a* may include at least an operating intensity and an action time. It is to be noted that the relationship between the second set of actions of the first adult toy 112*a* and the second adult toy 114*a*, and the gaseous characteristics and the third operating parameters may be predefined in the system 110 or either the first user 102 or the second user 106. For example, controlling the first adult toy 112*a* and the second adult toy 114*a* to perform the second set of actions includes controlling a vibrating motor (not shown in Figures) of the first adult toy 112*a* and the second adult toy 114*a* to perform the predetermined actions or controlling the first adult toy 112*a* and the second adult toy 114*a* to display different lighting effects.

The content management module 218 determines at least a scene information and a status information associated with the first user 102 in the content hosted in the interactive application 120. The status information may include, but not limited to, an expression, voice, and body posture of the first user 102 in the content created by the first user 102 in the interactive application 120. The scene information may include, but not limited to, sex scene information, such as oral sex scenes and female-on-top sex scenes. The stimulation device control engine 220 determines the gaseous characteristics corresponding to at least the scene information and the status information. Based on the determined gaseous characteristics, the stimulation device control engine 220 controls at least the first gas generating device 112*b* and the second gas generating device 114*b* associated with the first user 102 and the second user 106, respectively. In one embodiment, the gas generating device (i.e., the first gas generating device 112*b* and the second gas generating device 114*b*) is controlled to release a volatile medium based on the scene information. In one embodiment, the scene information is determined by different times or stages in the sexual process. For example, during couple's sexual process, the gas generating device (i.e., the first gas generating device 112*b* and the second gas generating device 114*b*) releases the corresponding volatile medium at different times of the sexual process.

Further, the processor 206 may receive odor data being captured by the first gas generating device 112*b* associated with the first user 102. For example, the first user 102 may use the first gas generating device 112*b* to detect the odors of a certain part of the user's body (such as vagina/anus). The stimulation device control engine 220 determines the gaseous characteristics corresponding to the odor data being captured by the first gas generating device 112*b*. Thereafter, the stimulation device control engine 220 transmits a third control instruction by appending the gaseous characteristics and third operating parameters of the one or more operating parameters to the second user 106. The third control instruction operates the second gas generating device 114*b* to release the volatile medium corresponding to the gaseous characteristics determined based on the odor data being captured by the first gas generating device 112*b*. The third operating parameters are determined based on an operating time and an operating intensity for operating the second gas generating device 114*b* to release the volatile medium corresponding to the gaseous characteristics. The third operating parameters are determined based on a time period of capturing the odor data by the first gas generating device 112*b*. For example, the odor data captured by the first gas generating device 112*b* may be the odor of vagina. In this example scenario, the stimulation device control engine 220 determines the gaseous characteristics corresponding to the odor data of vagina. The second gas generating device 114*b* releases the volatile medium corresponding to the odor data of vagina. Thus, it is understood that the second gas generating device 114*b* restores the odors of the vagina of the first user 102 so as to satisfy the second user's special odors preferences.

In addition, the stimulation device control engine 220 may determine an odor storage unit among a plurality of odor storage units (not shown in Figures) of the second gas generating device 114*b* corresponding to the odor data. The plurality of odor storage units stores the volatile medium of the one or more gaseous characteristics. To that effect, the third control instruction appended with the one or more gaseous characteristics and the third operating parameters operates the second gas generating device 114*b* to release the volatile medium from the odor storage unit corresponding to the odor data being captured by the first gas generating device 112*b*.

As explained above, the first gas generating device 112_b_ includes the insertion end 112_c_. The insertion end 112_c_ is configured to be inserted into one of a cavity (e.g., vagina or anus) of the first user's 102 body. The insertion end 112_c_ of the first gas generating device 112_b_ includes an aperture (not shown in Figures) for releasing the volatile medium corresponding to the one or more gaseous characteristics.

Further, the second stimulation device 114 is a male sex toy as explained above. In an embodiment, the second gas generating device 114_b_ may be configured with a flexible bag (not shown in Figures). The flexible bag may include an opening for receiving at least a portion of male genitalia (or the genitalia of the second user 106) for insertion therein. Thus, the second gas generating device 114_b_ is configured to release odor to the flexible bag. It is to be noted that the first gas generating device 112_b_ and the second gas generating device 114_b_ may include a guide through which the volatile medium corresponding to the gaseous characteristics is released at the nose of the first user 102 and the second user 106, respectively.

Figure 3B:
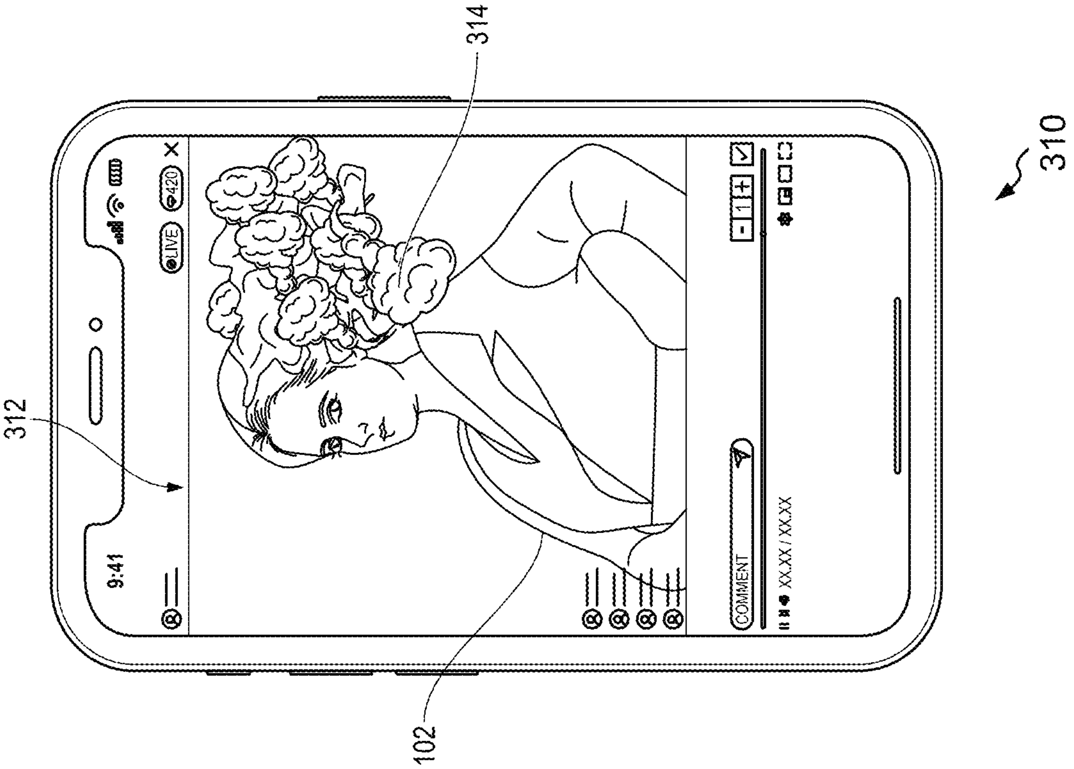
FIG. 3B illustrates an example representation of a user interface (UI) depicting a visual effect of image data superimposed on content of the first user, in accordance with an embodiment of the present disclosure.
Figure 3A:
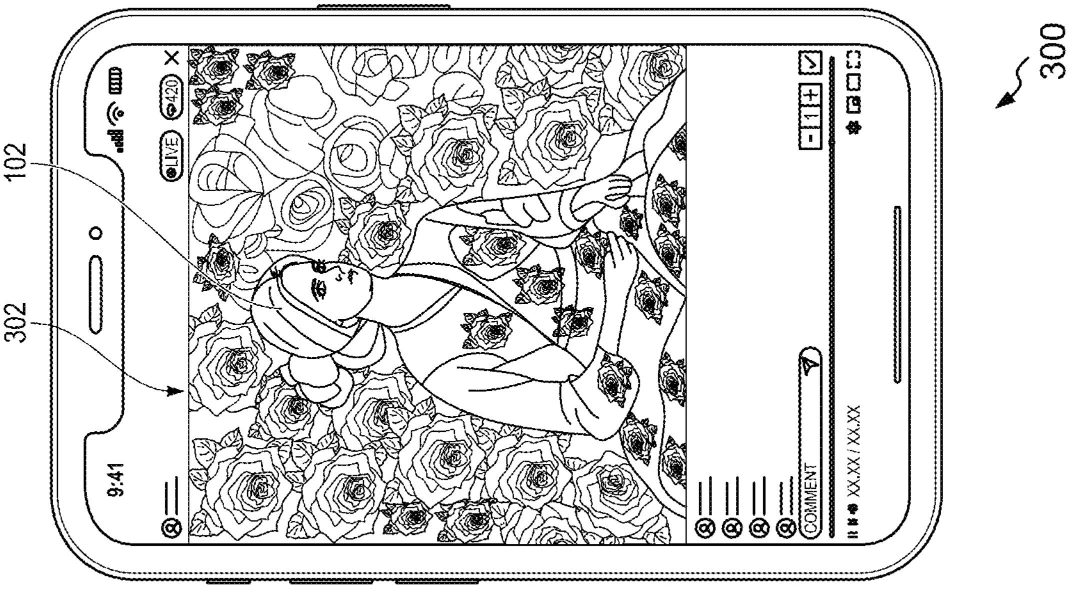
FIG. 3A illustrates an example representation of a user interface (UI) depicting image data superimposed on content of a first user, in accordance with an embodiment of the present disclosure.

FIG. 3A illustrates an example representation of a user interface (UI) 300 depicting image data superimposed on content of the first user 102, in accordance with an embodiment of the present disclosure. As shown, the UI 300 depicts content 302 performed by the first user 102. As explained above, the system 200 determines at least one image data (see, 304) corresponding to the gaseous characteristics. The image data 304 may be an object related to the gaseous characteristics superimposed on the content 302 of the first user 102. For example, the gaseous characteristics may be a rose odor. In this scenario, the image data may be the images of roses (as shown in FIG. 3A).

FIG. 3B illustrates an example representation of a user interface (UI) 310 depicting a visual effect of image data superimposed on content of the first user 102, in accordance with an embodiment of the present disclosure. As shown, the UI 310 depicts content 312 performed by the first user 102. In this scenario, image data 314 determined for the gaseous characteristics may be a visual effect. The visual effect (or the image data 314) may be a smoke effect superimposed on the content 312 of the first user 102.

As explained above, the system 200 determines the display rules based on the position of the first gas generating device 112_b_ in the content (e.g., the content 302 or the content 312) of the first user 102. The display rules may include, but not limited to, the rendering direction of the image data and the concentration of the visual effect for the image data (i.e., the image data 304 and/or the image data 314) determined corresponding to the gaseous characteristics.

Figure 4A:
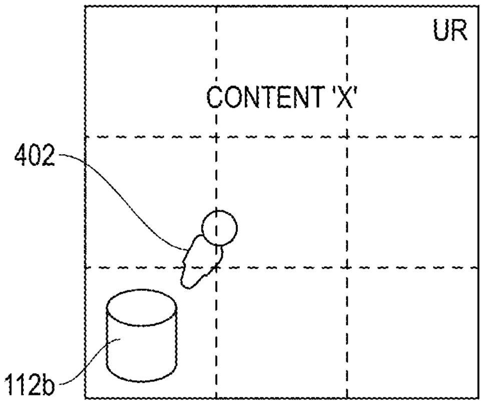
FIGS. 4A, 4B, 4C, 4D, and 4E illustrate an example representation of a position of a first gas generating device in the content of the first user and rendering direction of the image, in accordance with an embodiment of the present disclosure.

In one scenario, the determined position of the first gas generating device 112_b_ is lower left corner (exemplarily depicted as 'LL') of content 'X' (as shown in FIG. 4A). In this scenario, the display rules of the image data (such as an image data 402) may be toward upper right corner (exemplarily depicted as 'UR') (as shown in FIG. 4A). In other words, the rendering direction of the visual effect (e.g., smoke effect) or the direction of the image data 402 (e.g., roses) is towards the upper right corner when the determined position of the first gas generating device 112_b_ in the content 'X' is the lower left corner (LL) position (as shown in FIG. 4A).

Figure 4B:
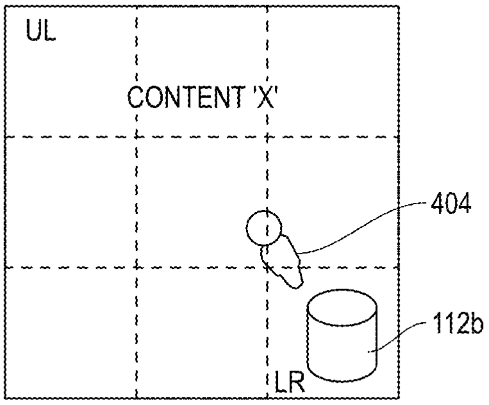

In another scenario, the determined position of the first gas generating device 112_b_ is lower right corner (exemplarily depicted as 'LR') of the content 'X' (as shown in FIG. 4B). In this scenario, the display rules of the image data (such as an image data 404) may be toward upper left corner (exemplarily depicted as 'UL') (as shown in FIG. 4B). In other words, the rendering direction of the visual effect (e.g., smoke effect) or the direction of the image data 404 is towards the upper left corner (UL) when the determined position of the first gas generating device 112_b_ in the content 'X' is the lower left corner (LR) position (as shown in FIG. 4B).

Figure 4C:
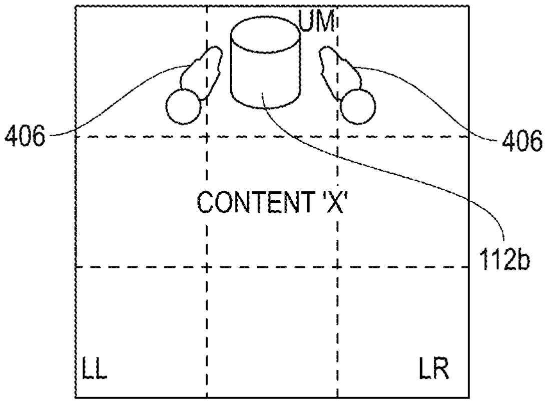

In another scenario, the determined position of the first gas generating device 112_b_ is an upper middle position (exemplarily depicted as 'UM') of the content 'X' (as shown in FIG. 4C). In this scenario, the display rules of the image data (such as an image data 406) may be toward the lower left corner (LL) and the lower right corner (LR) (as shown in FIG. 4C). In other words, the rendering direction of the visual effect (e.g., smoke effect) or the direction of the image data 406 is towards the lower left corner (LL) and the lower right corner (LR) when the determined position of the first gas generating device 112_b_ in the content 'X' is the upper middle (LR) position (as shown in FIG. 4C).

Figure 4D:
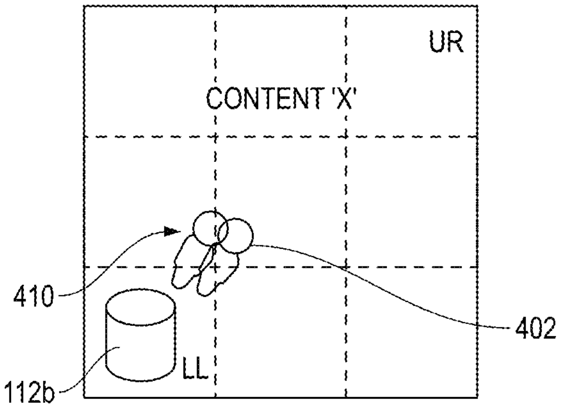
Figure 4E:
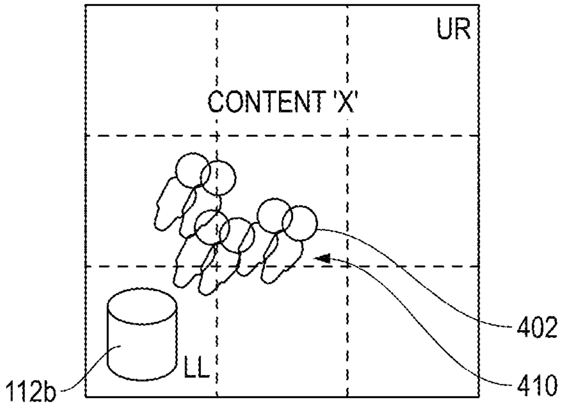

Further, a concentration (see, 410) of the visual effect for the image data (such as the image data 402) is less, when the intensity of the odor released by the first odor-generating device 112_b_ is less (as shown in FIG. 4D). Furthermore, the concentration (see, 410) of the visual effect for the image data 402 is more, when the intensity of the odor released by the first gas generating device 112_b_ is high (as shown in FIG. 4E). For example, if the determined gaseous characteristics is a rose odor, the visual effect of the rose odor is superimposed on the content 'X' and the concentration of the visual effect (or the smoke effect) of the rose odor is based on the intensity of the odor released by the first gas generating device 112_b_. It is to be noted that the image data and the visual effect of the image data are displayed on the content 'X' until the first gas generating device 112_b_ releases the odor corresponding to the determined gaseous characteristics.

Figure 5B:
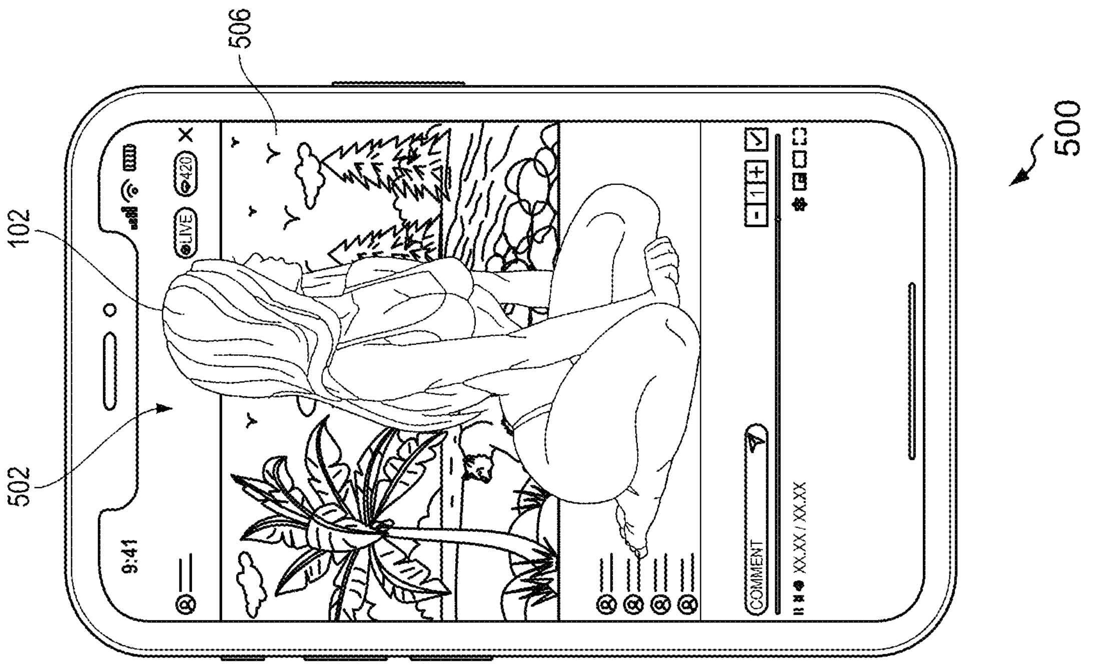
FIGS. 5A and 5B illustrate an example scenario depicting replacing a background in the content of the first user with a geographical location of a second user, in accordance with an embodiment of the present disclosure.
Figure 5A:
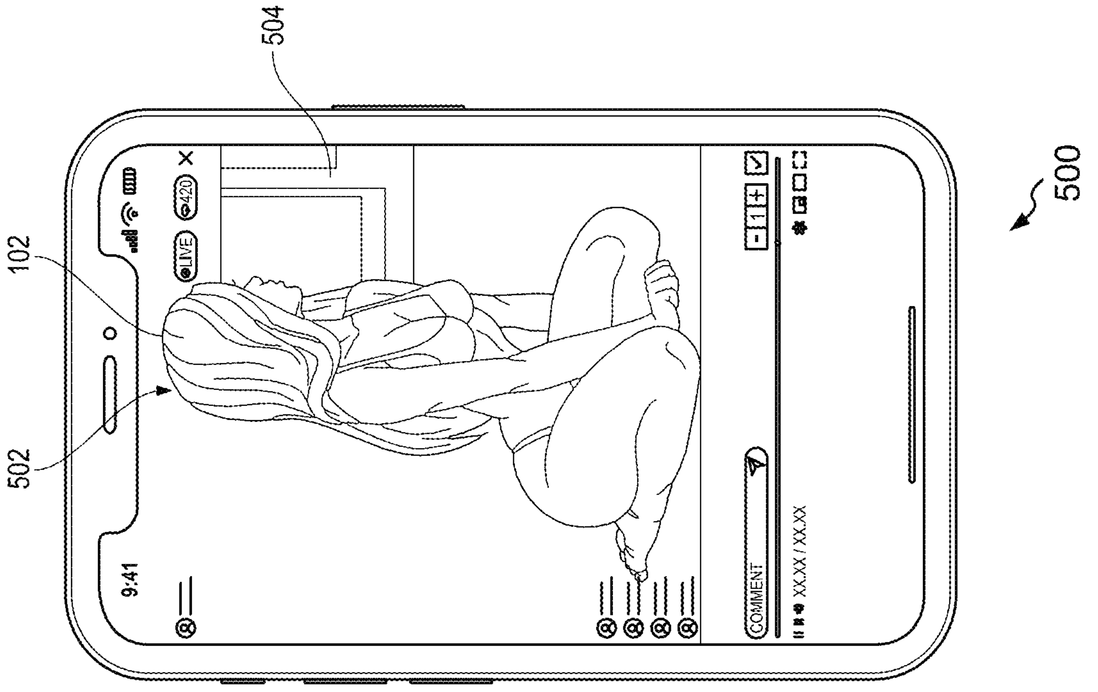

FIGS. 5A and 5B illustrate an example scenario depicting replacing a background of the content of the first user 102, in accordance with an embodiment of the present disclosure.

As shown in FIG. 5A, a user interface (UI) 500 is depicted to include content 502 being hosted by the first user 102 in the interactive application 120. The content 502 includes a background 504. As explained above, the second user 106 views the content 502 of the first user 102 in the user terminal 108 via the interactive application 120. In an embodiment, the second user 106 may send an input related to the geographical location of the second user 106. For example, the geographical location of the second user 106 may include a beach/sea. The system 200 may determine image data (see, 506 of FIG. 5B) corresponding to the geographical location (e.g., beach/sea) of the second user 106. Thereafter, the system 200 displays the image data 506 (e.g., beach/sea) corresponding to the geographical location of the second user 106 on the content 502 of the first user 102 in the interactive application 120 (as shown in FIG. 5B). In particular, the image data 506 corresponding to the geographical location of the second user 106 is displayed on the content 502 of the first user 102 by replacing the background 504 of the content 502 of the first user 102 (as shown in FIG. 5B).

Figure 6:
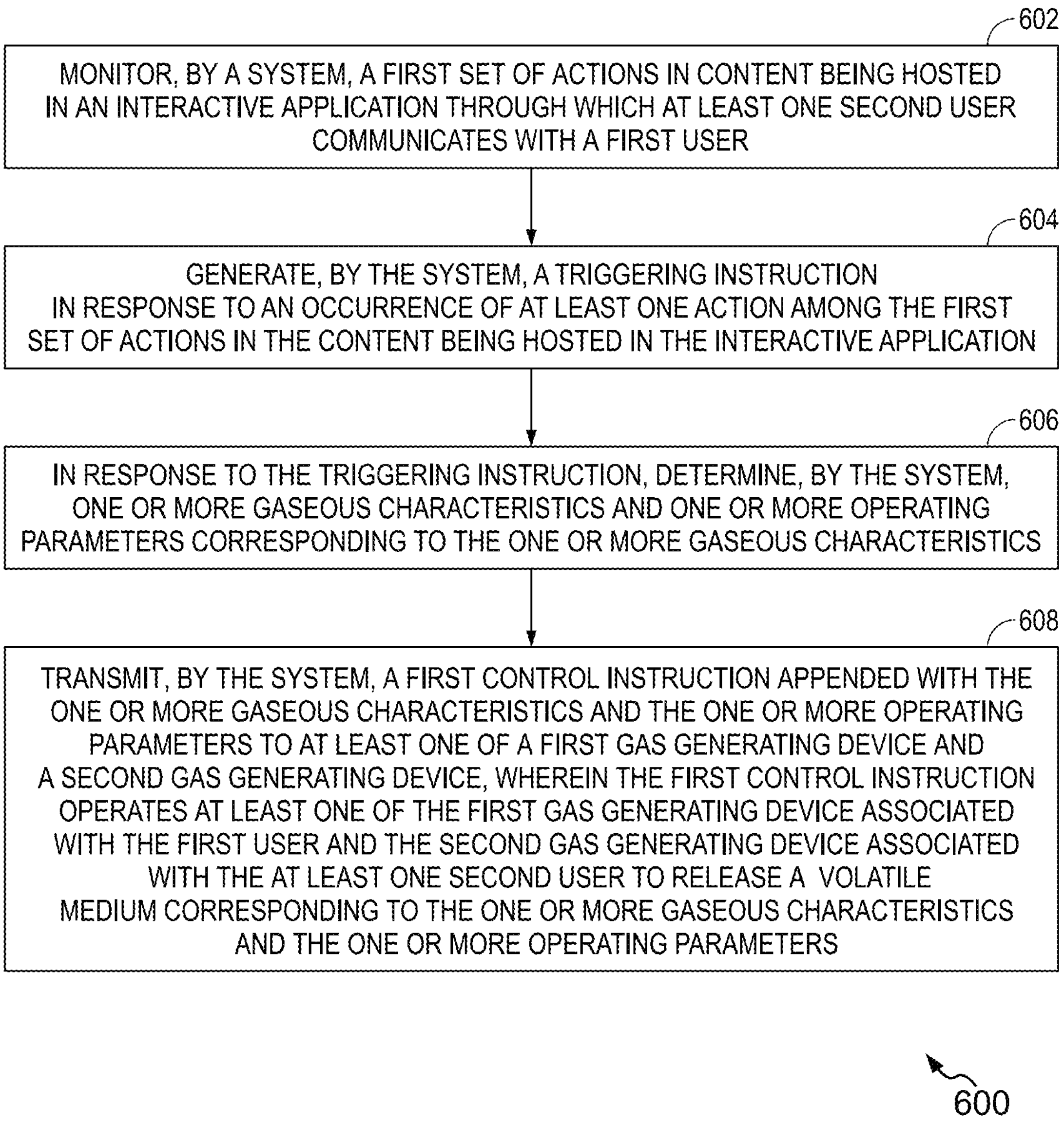
FIG. 6 illustrates a flow diagram of a computer-implemented method for providing interactive adult entertainment, in accordance with an embodiment of the present disclosure.

FIG. 6 illustrates a flow diagram of a computer-implemented method 600 for providing interactive adult entertainment, in accordance with an embodiment of the present disclosure. The method 600 depicted in the flow diagram may be executed by, for example, the system 200 or the system 110. Operations of the flow diagram of the method 600, and combinations of the operations in the flow diagram of the method 600, may be implemented by, for example, hardware, firmware, a processor, circuitry, and/or a different device associated with the execution of software that includes one or more computer program instructions. It is noted that the operations of the method 600 can be described and/or practiced by using a system other than these server systems. The method 600 starts at operation 602.

At operation 602, the method 600 includes monitoring, by the system 200, a first set of actions in content being hosted in an interactive application through which at least one second user communicates with a first user.

At operation 604, the method 600 includes generating, by the system 200, a triggering instruction in response to an occurrence of at least one action among the first set of actions in the content being hosted in the interactive application.

At operation 606, the method 600 includes in response to the triggering instruction, determining, by the system 200, one or more gaseous characteristics and one or more operating parameters corresponding to the one or more gaseous characteristics.

At operation 608, the method 600 includes transmitting, by the system 200, a first control instruction appended with the one or more gaseous characteristics and the one or more operating parameters to at least one of a first gas generating device and a second gas generating device. The first control instruction operates at least one of the first gas generating device associated with the first user and the second gas generating device associated with the at least one second user to release a volatile medium corresponding to the one or more gaseous characteristics and the one or more operating parameters. The one or more operations performed by the system 200 to provide sexual stimulation and release the volatile medium are explained with references to FIG. 1 to FIGS. 5A and 5B, therefore they are not reiterated herein for the sake of brevity.

Figure 7:
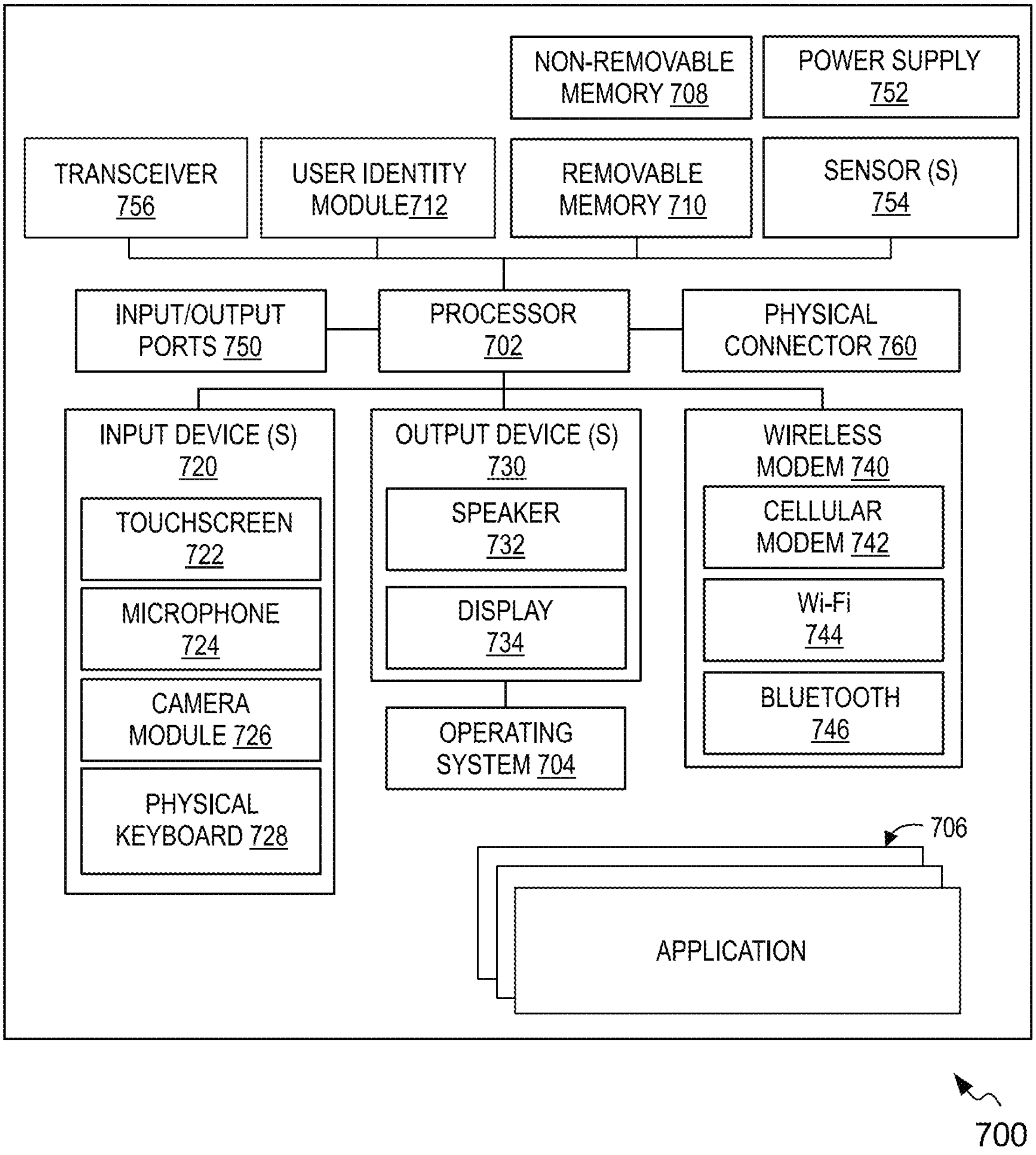
FIG. 7 is a simplified block diagram of an electronic device capable of implementing various embodiments of the present disclosure.

FIG. 7 is a simplified block diagram of an electronic device 700 capable of implementing various embodiments of the present disclosure. For example, the electronic device 700 may correspond to the user device 104 and the user terminal 108 of FIG. 1. The electronic device 700 is depicted to include one or more applications 706. One of the one or more applications 706 installed on the electronic device 700 is capable of communicating with a server (i.e., the system 200 or the system 110) for performing one or more operations related to operating the stimulation device to provide sexual stimulation and release the volatile medium as explained above.

It should be understood that the electronic device 700 as illustrated and hereinafter described is merely illustrative of one type of device and should not be taken to limit the scope of the embodiments. As such, it should be appreciated that at least some of the components described below in connection with the electronic device 700 may be optional and thus in an embodiment may include more, fewer, or different components than those described in connection with the embodiment of the FIG. 7. As such, among other examples, the electronic device 700 could be any of a mobile electronic device, for example, cellular phones, tablet computers, laptops, mobile computers, personal digital assistants (PDAs), mobile televisions, MR headset device, mobile digital assistants, or any combination of the aforementioned, and other types of communication or multimedia devices.

The illustrated electronic device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the electronic device 700 and supports one or more operations of the application (see, the applications 706) that implements one or more of the innovative features described herein. In addition, the applications 706 may include common mobile computing applications (e.g., telephony applications, email applications, calendars, contact managers, web browsers, messaging applications) or any other computing application.

The illustrated electronic device 700 includes one or more memory components, for example, a non-removable memory 708 and/or removable memory 710. The non-removable memory 708 and/or the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the applications 706. The electronic device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in the form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 732 and the display 734 can be combined into a single input/output device.

A wireless modem 740 can be coupled to one or more antennas (not shown in FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the electronic device 700 and a public switched telephone network (PSTN).

The electronic device 700 can further include one or more input/output ports 750, a power supply 752, one or more sensors 754 for example, an accelerometer, a gyroscope, a compass, or an infrared proximity sensor for detecting the orientation or motion of the electronic device 700 and biometric sensors for scanning biometric identity of an authorized user, a transceiver 756 (for wirelessly transmitting analog or digital signals) and/or a physical connector 760, which can be a USB port, IEEE 1294 (FireWire) port, and/or RS-232 port. The illustrated components are not required or all-inclusive, as any of the components shown can be deleted and other components can be added.

The disclosed method with reference to FIG. 6, or one or more operations of the system 110 or the system 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the application server 120 or the application server 700 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media includes any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system, comprising:

a memory storing executable instructions; and a processor operatively coupled with the memory and configured to execute the executable instructions stored in the memory to control the system to execute processes comprising:

monitoring a first set of actions in content in an interactive application through which at least one second user communicates with a first user, the monitoring the first set of actions including identifying at least one of a number of tokens input to the content, a total number of tokens having been input to the content, comments provided by the at least one second user with respect to the content, a total number of viewers of the content, and a virtual effect provided by the at least one second user to the first user in the content;

generating a triggering instruction in response to identifying, during the monitoring, an occurrence of at least one action from among the first set of actions in the content being hosted in the interactive application;

in response to the triggering instruction, determining one or more gaseous characteristics and one or more operating parameters corresponding to the one or more gaseous characteristics, and determining first operating parameters of the one or more operating parameters in response to receipt of the triggering instruction corresponding to the first set of actions; and transmitting a first control instruction appended with the one or more gaseous characteristics and the one or more operating parameters to at least one of a first gas generating device and a second gas generating device, the first control instruction controlling operation of at least one of the first gas generating device associated with the first user and the second gas generating device associated with the at least one second user to release a volatile medium corresponding to the one or more gaseous characteristics and the one or more operating parameters, wherein:

the one or more gaseous characteristics are determined based on preset rules defined for the first set of actions, and the first operating parameters include at least one of a total operating time, an operating intensity, an odor type, and a color type associated with the first gas generating device for releasing the volatile medium corresponding to the one or more gaseous characteristics.

2. The system as claimed in claim 1, wherein the processes further comprise:

receiving a request from a user terminal associated with the at least one second user to access the content being hosted in the interactive application; and in response to receipt of the request, facilitating a wireless communication between the user terminal of the at least one second user and a user device of the first user through the interactive application, thereby enabling the at least one second user to access the content of the first user via the interactive application, wherein the content is a sexual content being created by the first user in the interactive application.

3. The system as claimed in claim 1, wherein the processes further comprise:

determining at least one image data corresponding to each of the one or more gaseous characteristics; and rendering the at least one image data in the content created by the first user in the interactive application, thereby enabling the at least one second user with access to the content of the first user to view the at least one image data corresponding to each of the one or more gaseous characteristics.

4. The system as claimed in claim 3, wherein the processes further comprise:

determining a position of a first stimulation device of the first user in the content hosted in the interactive application;

determining at least one display rule for rendering the at least one image data corresponding to the one or more gaseous characteristics, the at least one display rule being defined based at least on the position of the first stimulation device in the content, and the at least one display rule comprising at least a rendering direction of the at least one image data and a concentration of a visual effect for the at least one image data determined corresponding to the one or more gaseous characteristics; and rendering the at least one image data and the visual effect corresponding to the one or more gaseous characteristics based at least on the position of the first stimulation device and the at least one display rule, wherein the at least one image data and the visual effect rendered in the content of the first user provides a visual representation of the volatile medium corresponding to the one or more gaseous characteristics being released by the first stimulation device of the first user.

5. The system as claimed in claim 4, wherein the processes further comprise:

receiving a geographical location of the at least one second user via the interactive application;

determining the at least one image data corresponding to the geographical location of the at least one second user; and displaying the at least one image data corresponding to the geographical location of the at least one second user on the content being hosted by the first user in the interactive application, wherein the at least one image data corresponding to the geographical location of the at least one second user is displayed on the content of the first user by replacing a background of the content of the first user.

6. The system as claimed in claim 1, wherein:

the processes further comprise transmitting a second control instruction to at least a user device of the first user and a user terminal of the at least one second user, in response to determining the one or more gaseous characteristics and second operating parameters of the one or more operating parameters corresponding to the triggering instruction, the second control instruction controls operation of a first adult toy of a first stimulation device associated with the first user and a second adult toy of a second stimulation device associated with the at least one second user to perform predetermined actions corresponding to the one or more gaseous characteristics, and the second operating parameters correspond to an operating time and an operating intensity defined for operating the first adult toy and the second adult toy corresponding to the one or more gaseous characteristics.

7. The system as claimed in claim 6, wherein:

the processes further comprise:

determining a second set of actions performed by at least one of the first adult toy of the first user and the second adult toy of the at least one second user; and determining the one or more gaseous characteristics and third operating parameters of the one or more operating parameters corresponding to the second set of actions, for controlling the first gas generating device of the first stimulation device associated with the first user and the second gas generating device of the second stimulation device associated with the at least one second user, and the third operating parameters are determined based at least on motion information of at least one of the first adult toy and the second adult toy, the motion information of at least one of the first adult toy and the second adult toy comprising at least an operating intensity and an action time.

8. The system as claimed in claim 1, wherein the processes further comprise:

determining at least a scene information and a status information associated with the first user in the content hosted in the interactive application; and determining the one or more gaseous characteristics corresponding to at least the scene information and the status information, for controlling at least the first gas generating device and the second gas generating device associated with the first user and the at least one second user, respectively.

9. The system as claimed in claim 1, wherein:

the processes further comprise:

receiving odor data being captured by the first gas generating device associated with the first user;

determining the one or more gaseous characteristics corresponding to the odor data being captured by the first gas generating device; and transmitting a second control instruction appended with the one or more gaseous characteristics and second operating parameters of the one or more operating parameters to the at least one second user, the second control instruction controls operation of the second gas generating device to release the volatile medium corresponding to the one or more gaseous characteristics determined based on the odor data being captured by the first gas generating device, and the second operating parameters comprise an operating time and an operating intensity for operating the second gas generating device to release the volatile medium corresponding to the one or more gaseous characteristics.

10. The system as claimed in claim 9, wherein:

the processes further comprise determining, from among a plurality of volatile media stored by the second gas generating device, the volatile medium corresponding to the odor data, the plurality of volatile media corresponding to the one or more gaseous characteristics, and wherein the second control instruction appended with the one or more gaseous characteristics and the second operating parameters control the second gas generating device to release the volatile medium corresponding to the odor data.

11. The system as claimed in claim 10, wherein:

the second gas generating device comprises a flexible bag having an opening configured to receive insertion of at least a portion of male genitalia therein, and the second gas generating device is configured to release odor to the flexible bag.

12. The system as claimed in claim 1, wherein:

the first gas generating device comprises an insertion end, the insertion end being configured to be inserted into a cavity of a body of the first user, and the insertion end of the first gas generating device comprises an aperture for releasing the volatile medium corresponding to the one or more gaseous characteristics.

13. A computer-implemented method, comprising:

monitoring, by a system, a first set of actions in content being hosted in an interactive application through which at least one second user communicates with a first user, the monitoring the first set of actions including identifying at least one of a number of tokens input to the content, a total number of tokens having been input to the content, comments provided by the at least one second user with respect to the content, a total number of viewers of the content, and a virtual effect provided by the at least one second user to the first user in the content;

generating, by the system, a triggering instruction in response to identifying, during the monitoring, an occurrence of at least one action from among the first set of actions in the content being hosted in the interactive application;

in response to the triggering instruction, determining, by the system, one or more gaseous characteristics and at least two operating parameters corresponding to the one or more gaseous characteristics, the one or more gaseous characteristics being determined based on preset rules defined for the first set of actions; and transmitting, by the system, a first control instruction appended with the one or more gaseous characteristics and the at least two operating parameters to at least one of a first gas generating device and a second gas generating device, the first control instruction controlling operation of at least one of the first gas generating device associated with the first user and the second gas generating device associated with the at least one second user to release a volatile medium corresponding to the one or more gaseous characteristics and the at least two operating parameters, and the at least two operating parameters including both a total operating time and an operating intensity of the first gas generating device for releasing the volatile medium corresponding to the one or more gaseous characteristics.

14. The computer-implemented method as claimed in claim 13, further comprising:

determining, by the system, at least one image data corresponding to each of the one or more gaseous characteristics; and rendering, by the system, the at least one image data in the content created by the first user in the interactive application, thereby enabling the at least one second user with access to the content of the first user to view the at least one image data corresponding to each of the one or more gaseous characteristics.

15. The computer-implemented method as claimed in claim 14, further comprising:

determining, by the system, a position of a first stimulation device of the first user in the content hosted in the interactive application;

determining, by the system, at least one display rule for rendering the at least one image data corresponding to the one or more gaseous characteristics, the at least one display rule being defined based at least on the position of the first stimulation device in the content, and the at least one display rule comprising at least a rendering direction of the at least one image data and a concentration of a visual effect for the at least one image data determined corresponding to the one or more gaseous characteristics; and rendering, by the system, the at least one image data and the visual effect corresponding to the one or more gaseous characteristics based at least on the position of the first stimulation device and the at least one display rule, wherein the at least one image data and the visual effect rendered in the content of the first user provides a visual representation of the volatile medium corresponding to the one or more gaseous characteristics being released by the first stimulation device of the first user.

16. The computer-implemented method as claimed in 13, further comprising:

transmitting, by the system, a second control instruction to at least a user device of the first user and a user terminal of the at least one second user, in response to determining the one or more gaseous characteristics and second operating parameters of the at least two operating parameters corresponding to the triggering instruction, wherein the second control instruction controls operation of a first adult toy of a first stimulation device associated with the first user and a second adult toy of a second stimulation device associated with the at least one second user to perform predetermined actions corresponding to the one or more gaseous characteristics, and wherein the second operating parameters correspond to an operating time and an operating intensity defined for operating the first adult toy and the second adult toy corresponding to the one or more gaseous characteristics.

17. The computer-implemented method as claimed in claim 16, further comprising:

determining, by the system, a second set of actions performed by at least one of the first adult toy of the first user and the second adult toy of the at least one second user; and determining, by the system, the one or more gaseous characteristics and third operating parameters of the at least two operating parameters corresponding to the second set of actions, for controlling the first gas generating device of the first stimulation device associated with the first user and the second gas generating device of the second stimulation device associated with the at least one second user, wherein the third operating parameters are determined based at least on motion information of at least one of the first adult toy and the second adult toy, the motion information of at least one of the first adult toy and the second adult toy comprising at least an operating intensity and an action time.

18. The computer-implemented method as claimed in claim 13, further comprising:

receiving, by the system, odor data being captured by the first gas generating device associated with the first user;

determining, by the system, the one or more gaseous characteristics corresponding to the odor data being captured by the first gas generating device; and transmitting, by the system, a second control instruction appended with the one or more gaseous characteristics and operating parameters of the at least two operating parameters to the at least one second user, wherein the second control instruction controls operation of the second gas generating device to release the volatile medium corresponding to the one or more gaseous characteristics determined based on the odor data being captured by the first gas generating device, and wherein the at least two operating parameters comprise an operating time and an operating intensity for operating the second gas generating device to release the volatile medium corresponding to the one or more gaseous characteristics.

* * * * *